US006976900B2

(12) United States Patent
Bolz

(10) Patent No.: US 6,976,900 B2
(45) Date of Patent: Dec. 20, 2005

(54) AUTOMATIC ROLL DATA ACQUISITION SYSTEM

(75) Inventor: William F. Bolz, St. John, IN (US)

(73) Assignee: United States Steel Corp., Philadelphia, PA (US)

( * ) Notice: Subject to any disclaimer, the term of this patent is extended or adjusted under 35 U.S.C. 154(b) by 0 days.

(21) Appl. No.: 10/794,910

(22) Filed: Mar. 5, 2004

(65) Prior Publication Data
US 2005/0197044 A1    Sep. 8, 2005

(51) Int. Cl.[7] .......................... B24B 49/00; G05B 19/18
(52) U.S. Cl. .................... 451/5; 451/9; 451/10; 700/56
(58) Field of Search ................... 451/5, 9, 10, 11; 711/154; 700/56–66, 159; 340/680

(56) References Cited

U.S. PATENT DOCUMENTS

| 3,653,161 | A | * | 4/1972 | Clark, Jr. ..................... 451/4 |
| 3,713,149 | A | * | 1/1973 | Cardullo et al. .............. 342/42 |
| 4,855,923 | A | | 8/1989 | Fullmer |
| 5,800,247 | A | | 9/1998 | Harms |
| 5,864,482 | A | * | 1/1999 | Hazama et al. ............... 700/95 |
| 6,065,857 | A | * | 5/2000 | Hazama et al. ............... 700/95 |
| 6,081,857 | A | * | 6/2000 | Frary .......................... 710/74 |
| 6,087,930 | A | * | 7/2000 | Kulka et al. ................. 340/447 |
| 6,094,793 | A | | 8/2000 | Szuba |
| 6,249,227 | B1 | | 6/2001 | Brady et al. |
| 6,283,823 | B1 | | 9/2001 | Mori et al. |
| 6,306,007 | B1 | | 10/2001 | Mori et al. |
| 6,354,468 | B1 | * | 3/2002 | Riek ........................ 222/129.3 |
| 6,451,154 | B1 | | 9/2002 | Grabau et al. |
| 6,476,708 | B1 | * | 11/2002 | Johnson .................... 340/10.34 |

(Continued)

FOREIGN PATENT DOCUMENTS

EP    1 130 485 A1    9/2001

(Continued)

OTHER PUBLICATIONS

American Institute of Iron and Steel Engineers "Construction and Operation of Rolling Mills"; Ch. 23 "The Making, Shaping and Treating of Steel" 1985; Herbick & Held, USA.

*Primary Examiner*—Joseph J. Hail, III
*Assistant Examiner*—Alvin J. Grant
(74) *Attorney, Agent, or Firm*—McNees Wallace & Nurick LLC

(57) ABSTRACT

The present invention discloses a method, system and apparatus for use in a roll grinding machine. Data is read from an RFID tag automatically by providing an RF read/write sensor on a movable cylinder rod. The RF sensor is held away from the work roll area while the work roll is loaded or removed. When the work roll is placed in the position for grinding, a signal to rotate the roll is sent to the grinding machine, and also operates to advance the cylinder rod. An RFID tag embedded in the work roll and containing identification and other data related to the work roll, is read by a read/write sensor, and the data is then transferred from the sensor to a serial control interface, which converts the data and transmits the information to the grinding machine control desk and the computer control management data base. The work roll identification information is transmitted automatically to the grinding machine, eliminating errors in transposing information manually and avoiding potential injury to personnel from having to scan the RFID tag using handheld RF read/write modules.

18 Claims, 5 Drawing Sheets

| U.S. PATENT DOCUMENTS | | | | FOREIGN PATENT DOCUMENTS | | |
|---|---|---|---|---|---|---|
| 6,585,558 B1 | 7/2003 | Mori et al. | | EP | 1 339 014 A | 8/2003 |
| 6,642,444 B2 * | 11/2003 | Hagiwara et al. ............. 84/609 | | JP | 3662227511 A | 10/1987 |
| 2003/0013388 A1 | 1/2003 | Buttram | | WO | WO 03/018253 A1 | 3/2003 |
| 2003/0025027 A1 | 2/2003 | Ebisawa et al. | | | | |
| 2003/0102367 A1 | 6/2003 | Monette et al. | | * cited by examiner | | |

AUTOMATIC ROLL DATA ACQUISITION SYSTEM

FIELD OF THE INVENTION

The disclosed invention relates to a method, system and apparatus for reading data from a rolling mill roll, and more particularly, to a method, system and apparatus for acquiring data from an RFID tag attached to a roll using a movement arm to position the receiver proximate to the RFID tag.

BACKGROUND OF THE INVENTION

Rolling mills for rolling steel and other metals are comprised of multiple rolls for forming metal into sheets. The rolls must be machine ground periodically in order to maintain proper surface tolerances on the sheet products. When a new roll is received in a roll shop, an RFID tag is embedded in the end face of the roll. The shop clerk, upon receipt of the new roll, assigns an identification number to the roll and writes the string of data to the RFID tag using an input device. FIG. 3 shows a typical input device.

The shop then maintains a database containing a running history of the surface. wear and machining of the roll. Rolls may be re-ground several times during their useful life. A roll is placed in service in a rolling mill for a period of time, eventually becoming deformed through wear. The roll is then returned to the shop for grinding. Thus when the roll is returned to the shop to be ground, the characteristics of the roll can be measured, and a profile established automatically for regrinding the roll to the desired profile. "The Making Shaping and Treating of Steel", $10^{th}$ Ed., Herbick & Held [Chapter 23 "Construction and Operation of Rolling Mills"] provides a detailed explanation of rolling mills and is hereby incorporated by reference.

The data related to a roll can be written to a radio frequency identification ("RFID") device and stored. The RFID device is commonly termed an RFID tag. RFID tags are miniscule microchips, which may be as tiny as half of a grain of sand. In practice, the RFID tags are housed in a disc slightly larger than the size of a coin. Some roll manufacturers include an RFID device embedded into a recess at one end of the roll. A radio frequency transponder system typically includes an RF reader unit and an RFID device. Operation of the RF transponder system is generally characterized by multiple operating modes including excitation, response and read modes. The RF transponder system requires electrical power to operate in each of these modes. In particular, the RF reader unit must be powered during the excitation and read modes while the RFID device must be powered during the response mode. Typically, in RF transponder systems the RFID device is a passive device, i.e., the RFID device lacks an internal power source or physical connection to an external power source. The passive RFID device is powered remotely by the RF reader unit while the RFID device is free of contact with the RF reader unit. An exemplary passive RFID device and its method of operation are disclosed in U.S. Pat. No. 4,730,188 to Milheiser. The RF reader unit is conventionally connected to an electrical power source, such as an ac power line, which powers the RF reader unit.

The embedded RFID tag is normally placed in the flat, circular end surface of the roll cylinder. This portion of a roll is where the roll normally rests in a bearing when in use in a rolling mill. It is also where the roll rests when set into a grinding machine for resurfacing. The rolls are massive pieces, and the movement of the rolls may be hazardous to personnel working in the immediate area, such as when the rolls are being moved into and out of position for grinding.

Presently, the operator must acquire the roll data from the RFID tag using a manual RF reader, by walking from the operator's control desk to the footstock portion of a grinding machine to hold the RF reader adjacent to the RFID tag, then return to the control desk to transfer the roll data manually into a computerized database so that the grinding profile can be generated. The footstock portion of a grinding machine is the portion opposite the headstock portion containing the motor drive for rotating the workpiece—i.e., the roll—for grinding. The operator must stand in the immediate area of the heavy moving equipment while performing this manual read operation. This process creates potential for workplace injuries, and for human error in transferring the data. Also, time saved in transferring the data results in inefficiency in the grinding operation.

Thus, there exists a need for a fully automated method, system and apparatus for acquiring data from an RFID tag associated with a rolling mill roll by automatically positioning an RF reader.

SUMMARY OF THE INVENTION

A system is disclosed for acquiring data from a passive memory device for use in an automated roll grinding machine. The system comprises a reading means for reading data from the passive memory device, coupled via an interface with a controller for a digitally controlled roll grinding machine. A positioning means is provided for movement of the reading means from a retracted position to an extended position adjacent to said passive memory device. The controller is programmed to sense that a roll is positioned within said roll grinding machine, and to extend said positioning means into a position proximate said passive memory device sufficiently to induce an electro-magnetic field, exciting the passive memory device for transmitting data to the reading means. The reading means returns to a retracted position upon completion of the data reading function.

In a preferred embodiment the reading means comprises a transponder device for exciting an electromagnetic field in a passive memory device when disposed proximate to said passive memory device. The positioning means comprises a cylinder having a central bore and a rod axially disposed within said bore, said rod being positionable pneumatically in at least two positions, including a retracted position and an extended position. There is also included a mounting bracket attached to the grinding machine for supporting the cylinder and an adjustment means for setting the distance between the passive memory device and the transponder when the cylinder is in the fully extended position. An offset bracket is optionally provided for axially alignment of the transponder with the passive memory device.

It is an object of the present invention to improve the integrity of roll data entry by eliminating human error associated with manual entry of data into the grinder controller during resurfacing of used rolls and measurement of new rolls.

It is an object of the present invention to provide a method and system which provides greater personnel safety by automatically positioning an RF reader adjacent to a roll in a roll grinding machine.

Another object of the present invention is to provide a system and apparatus that automatically acquires the information from an RFID tag on a roll.

Yet another object of the present invention is to provide a means by which a receiver is moved or retracted when no roll is in position, and is thereby protected from harm due to the movement of large, heavy rolls into position on a roll grinding machine.

A further object of the present invention is to provide a method, system and apparatus that enables safer environment for acquisition and storage of roll data by reducing personnel proximity to heavy grinding machinery and moving rolls.

DETAILED DESCRIPTION OF THE INVENTION

Figure 1:
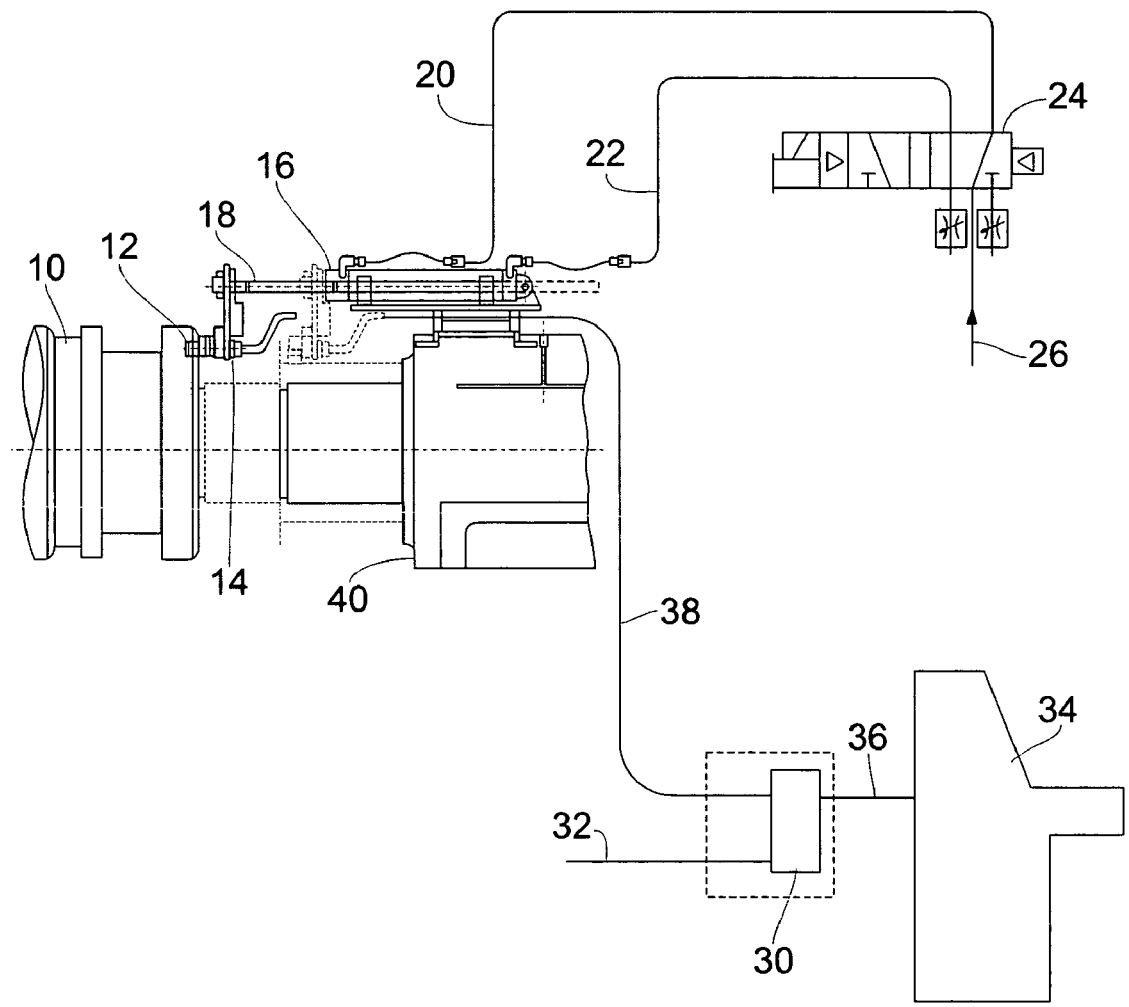
FIG. 1 is a schematic diagram of the system of the present invention.
Figure 2:
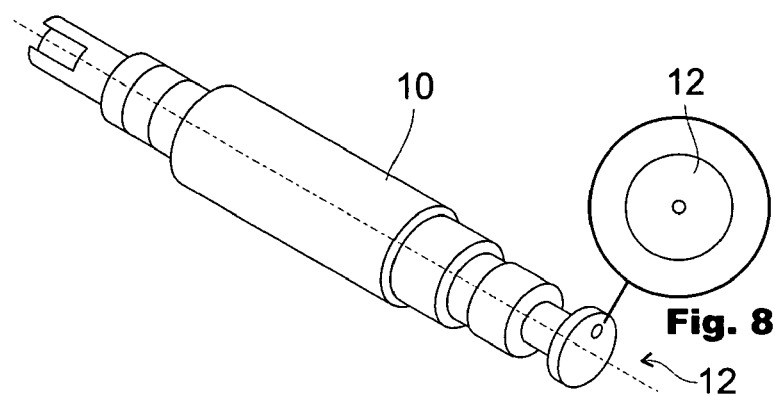
FIG. 2 is an isometric fragmentary view of a work roll and RFID tag.
Figure 3:
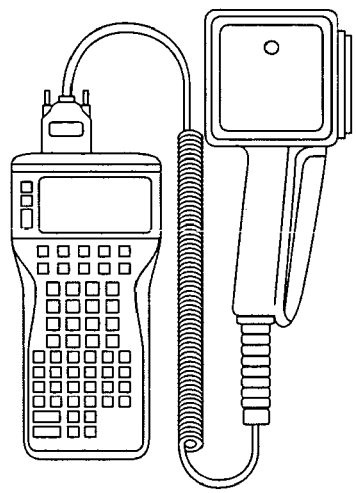
FIG. 3 shows a prior art input device.

Referring to FIGS. 1 and 2, the journaled end of a work roll 10 has embedded therein an inductive read/write data carrier. The work roll is supported by a hydraulic rest (not shown). The inductive read/write data carrier is also referred to as "RFID tag". A pneumatic cylinder 16 is mounted on the grinding machine footstock (not shown) a pre-determined distance away from the resting position of the work roll 10. The cylinder 16 contains a rod 18 axially displaceable along a pre-determined cylinder stroke. Read/write sensor 14 is connected to the end of rod 18 such that when the rod is fully extended, sensor 14 is positioned in close proximity—preferably within one inch—of the end face of roll 10.

It should be noted that RFID tag 12 embedded in the end of work roll 10 positioned at a point toward the periphery of work roll face 42. When work roll 10 is placed in position in the grinding machine, the RFID tag may fall randomly in position at any point. RFID tag 12 is not necessarily keyed or otherwise registered in alignment with the point adjacent to the sensor. However, as will be explained below, work roll 10 is rotated 360° in order for the grinding machine to measure the profile of work roll 10 prior to the grinding sequence. Consequently, at some point during rotation of work roll 10, RFID tag 12 is aligned with read/write sensor 14, enabling the induction of an electromagnetic field in the RFID tag necessary for energizing the transponder system. Work roll 10 is rotated slowly during the measurement, so that the read operation occurs as the RFID tag passes slowly by the sensor 14. It is not necessary that the roll be completely stopped for the sensor 14 to read data from RFID tag 12.

Cylinder air supply lines 20, 22 are pneumatically coupled to cylinder 16 for advancing and retracting cylinder rod 18. A directional valve 24 selectively pressurizes and depressurizes the appropriate air lines 20,22. Preferably a spring (not shown) is also attached to the pneumatic actuator rod to bias cylinder rod 18 and sensor 14 in a retracted position clear of the work roll and moving equipment while the work roll is being loaded and unloaded. Read/write sensor 14 reads data from the RFID tag 12 and communicates data to a grinder control desk 34 by way of a serial control interface 30. Sensor 14 is electronically coupled via shielded cable 38 with the input to serial control interface 30. Serial control interface 30 converts the data into proper format and communicates by way of a cable—preferably an RS-485 dual twisted pair cable—to the grinding machine controller and roll data software link to a roll shop management system database (not shown) in the grinder control desk 34. The controller typically comprises any of a number of commercially available digital programmable logic controller (PLC), or may be implemented through software applications installed on a general-purpose computer. In the embodiment of the present invention, a Siemens 880 CNC control system is provided with the grinder control package for executive level control of the various machine tool axis. A personal computer (PC) is the primary source of communication to the grinder CNC system. The necessary roll data including grind history and roll identification is passed on to the CNC control system via the communication network from the on-board PC. This PC accesses a centralized database for archival records of grind history, which may be used, for example, for comparison analysis between vendors or performance tracking. However, any PLC or computer capable of data communication via a serial control interface is sufficient for the automatic roll data acquisition system.

Directional valve 24 operates to apply pressure on the rod end of cylinder when the cylinder is retracted. When the directional valve solenoid is energized the cylinder 16 is pressurized and cylinder rod 18 extended adjacent to work roll face 42. The signal to energize valve 24 is sent from the grinder controller to valve 24 solenoid when the grinder cycle begins. After the roll data is obtained, the valve 24 solenoid is de-energized and the cylinder retracts automatically.

Figure 8:
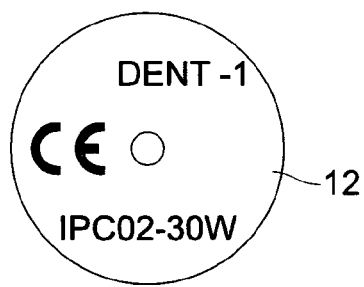
FIG. 8 is a fragmentary view of the RFID tag indicated by section 8 in FIG. 2.

FIG. 2 provides a isometric view of the work roll 10 with an embedded RFID tag 12. A magnified insert is shown indicating the RFID tag enlarged in FIG. 8.

Figure 4:
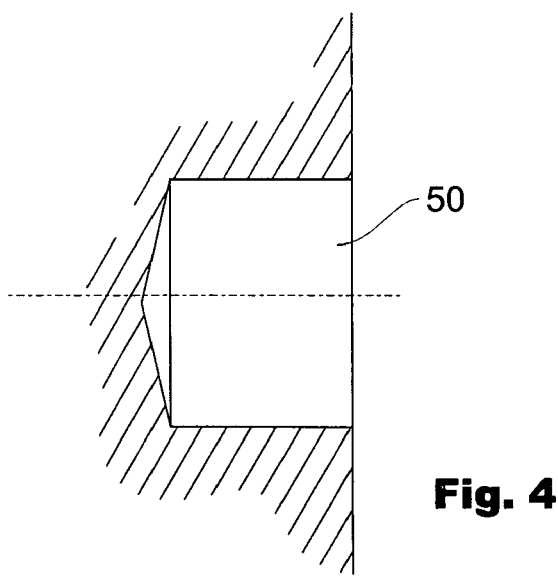
FIG. 4 shows a detail of the recess in a work roll.

FIG. 4 illustrates a recess 50 machined into the end face of the work roll for housing the RFID tag. The opening is typically one inch in diameter and three quarter inches deep with a chamfer in the bottom of the recess, although the dimension of the recess may vary to accommodate RFID tags of varying dimensions.

The pneumatic cylinder is the method used in the preferred embodiment for positioning sensor head 14 adjacent RFID tag 12. Those skilled in the art will appreciate that various other means may be employed in which to position the sensor. For example, a hydraulic cylinder may be substituted for a pneumatic cylinder, or a worm drive and motor, are but a few examples of alternate means to accomplish advancement retraction of the sensor 14. The cylinder is maintains the sensor at a safe clear distance from the heavy, moving work rolls and associated handling mechanisms (not shown) while they the work rolls are in transition. In the disclosed method and system, six inches or more of clearance is generally sufficient to avoid harmful contact between the sensor 14 and a work roll 10.

Figure 5:
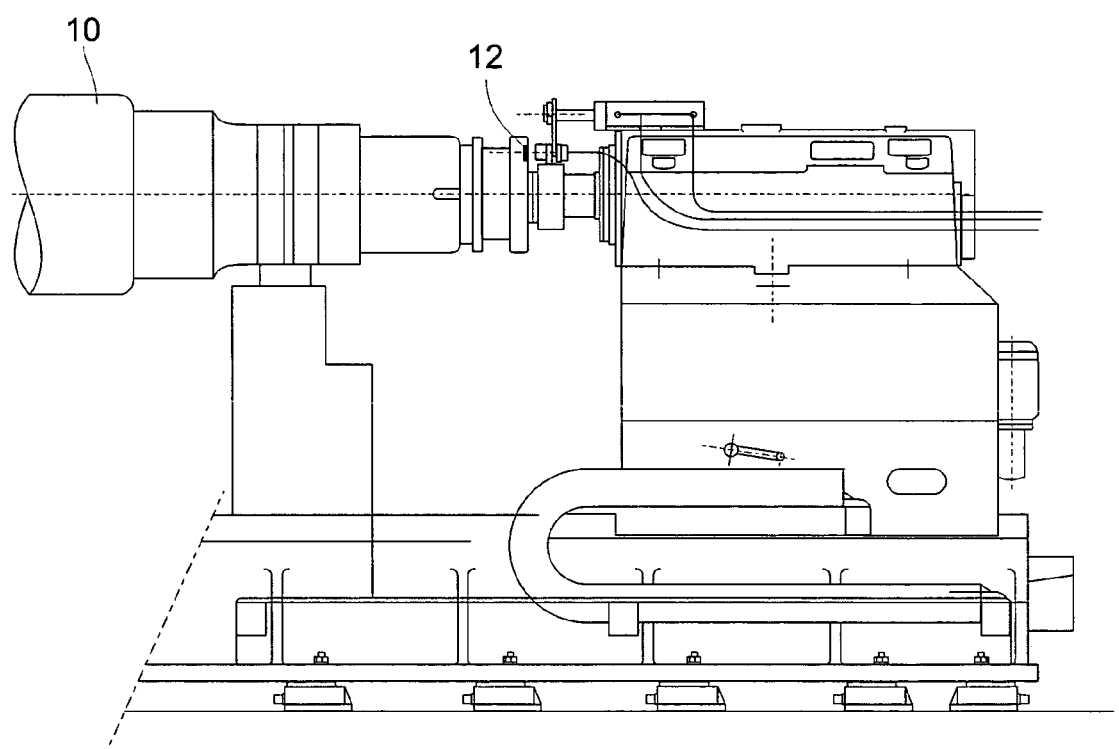
FIG. 5 is sectional elevational view taken along the lines 5—5 in FIG. 6.
Figure 6:
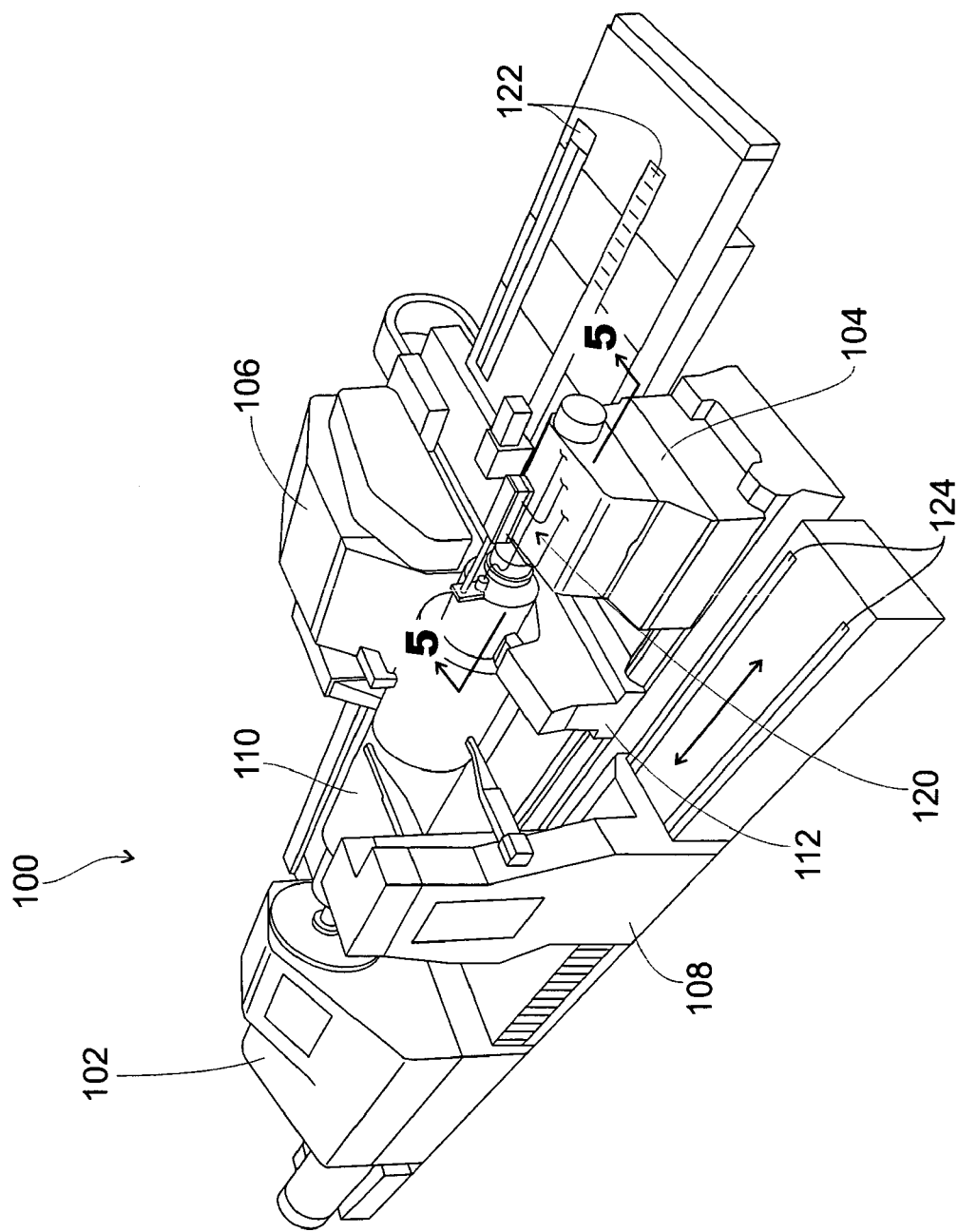
FIG. 6 is an isometric view of a grinding machine.

FIGS. 5 and 6 provides schematic illustrations of the grinding machine for illustrating the placement of the data acquisition system on the grinding machine footstock. FIG. 5 is a partial sectional elevation of the grinding machine footstock taken along the lines 5—5 in FIG. 6. FIG. 6 is an isometric view of the grinding machine. A grinding machine generally designated as 100 includes a headstock 102 at one end and footstock 104 at the opposite end. A work roll 110 is placed between headstock 102 and footstock 104 for calibration and grinding. A carriage and wheel head 106 supports a rotary grinding wheel (not shown) for grinding the work roll. Opposite the carriage and wheelhead 106 is a caliper assembly 108 for measuring the work roll profile before and after grinding. Caliper assembly 108 and carriage and wheelhead 106 traverse tracks 122,124 in the axial direction of the work roll in order to take measurements and to grind the work roll. The data acquisition system 120 is shown disposed on top of the footstock 104 adjacent the end of work roll 110. The rest 112 supports work roll 110 when the work roll is positioned for calibration and grinding.

Referring next to Fig, 7, the method is illustrated in enlarged sectional view. The sequence begins by loading a work roll 10 into the grinding machine. A footstock quill 212 extends to engage the end of work roll 10 and to rotate the work roll. The read/write sensor 14 is advanced from the retracted position 210 to the extended position 220, adjacent the work roll (typically within one inch of the face of the work roll). The work roll 10 is then rotated to measure the surface profile. As the work roll is rotated, data is read by read/write sensor 14 when RFID tag 12 passes the read/write sensor while the work roll is being rotated. Since the work roll is rotated slowly in the grinding machine, the relative movement between sensor and RFID tag does not interfere with the data transfer. The roll data, including identification information and any other data that may optionally be stored thereon, is transmitted via the read/write sensor through shielded cable 38 to serial control interface (not shown). The read/write system is preferably configurable for communication with a variety of digital input/output formats and network topologies, such as RS-232, RS-422 and RS-485 standard communications interfaces.

Figure 7:
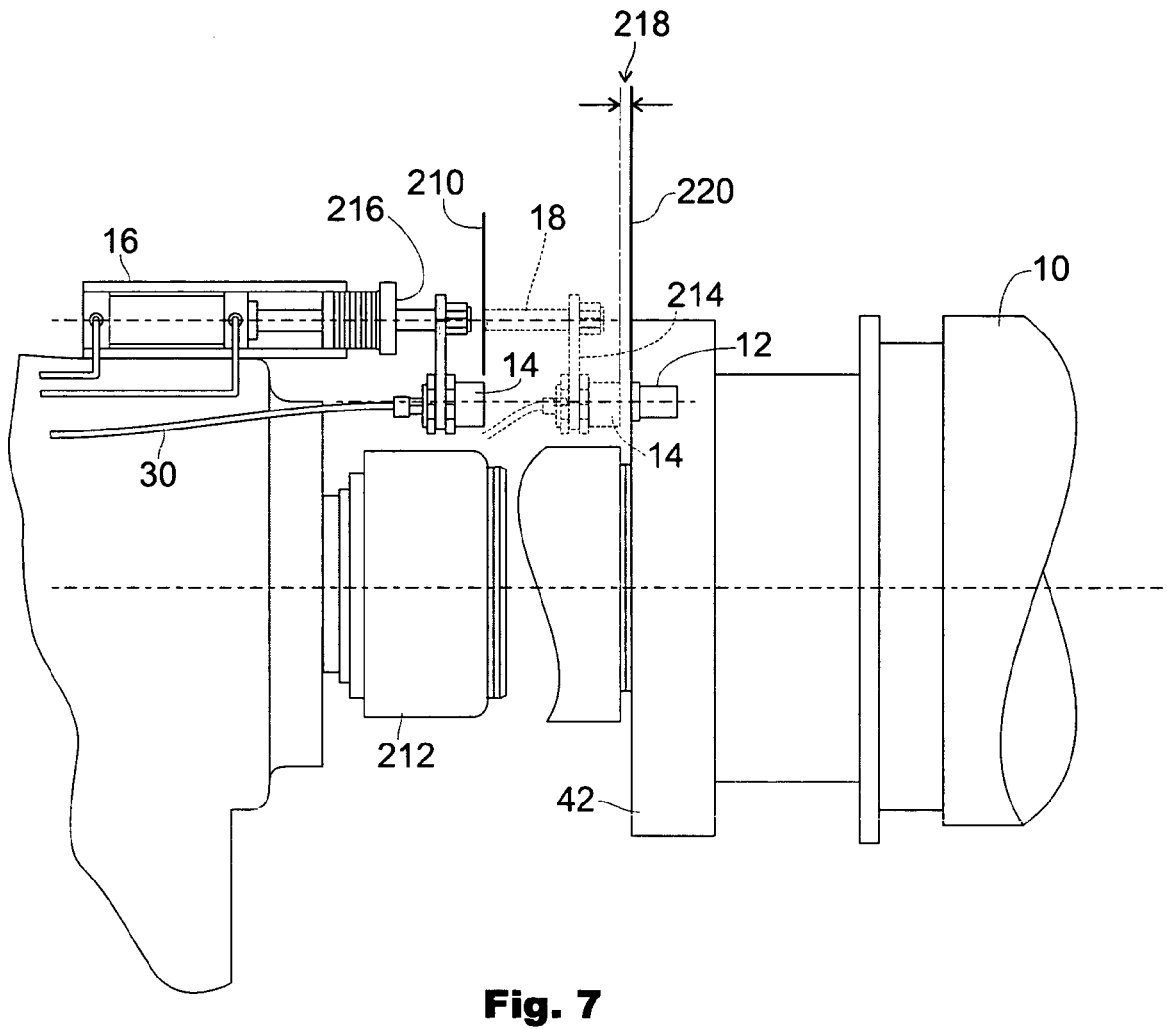
FIG. 7 is an enlarged view showing the retracted and extended positions of the read/write sensor.

Also shown in FIG. 7 is the arrangement of the read/write sensor 14 on bracket 214 attached to an adjustable stop fitting 216. Fitting 216 is threadedly coupled to cylinder rod 18. Adjustable stop fitting 216 provides a means for adjusting the gap 218 between sensor 14 and work roll face 42.

In FIG. 7 the sensor extended position 220 of the bracket and read/write sensor is indicated by broken lines. Also, the footstock quill 212 is indicated by broken lines in the extended position. Finally, the grinding machine computer acknowledges the receipt of work roll identification information and a signal is communicated back to the operator console and the sensor is retracted. The signal to extend the cylinder is initiated by the rotate roll signal, which begins the work roll rotation of 360° for measurement purposes. It is also an indicator that the machine has sensed the work roll in the proper position, or that the operator is satisfied that the work roll is in the proper position for measurement, and is therefore Thus, using the present invention, the operator obtains the identification information from the work roll without leaving the control desk 34. The reference data contained on the RFID tag is transmitted directly to the grinding machine computer, which then accesses the grinding records of the work roll to begin calibration and grinding. The risk of injury to the operator is thereby reduced, and the accuracy of the data is ensured by not having to manually input the roll ID information into the grinding machine computer.

The Method

A method and system is also disclosed in the present invention. A work roll for grinding is provided with at least one passive memory storage device. The memory storage device has data stored thereon related to the work roll to which it is attached. Preferably the memory storage device is an RFID tag. Next, the workpiece is positioned within a support frame in the grinding machine for measurement and grinding. The work roll is verified as being in the desired position for grinding. The reading means is advanced toward the memory storage device to a spacing sufficiently proximate to said memory storage means—about one inch or less—for communication to occur between said memory storage device and the reading means.

Data is then accessed from the memory storage means and the data is communicated to a computer associated with the grinding apparatus for controlling the grinding machine. Data includes identification information, but additional information may be stored on the RFID tags. A listing of optional roll data fields for storage and tracking are set forth in Appendix A below. The use of these (and other) data fields is particularly useful for systems where a centralized database and computer system is not accessible. This listing is presented by way of example and not by limitation, of the variety of useful parameters that may be stored and tracked.

A signal is communicated to an operator control station to acknowledge receipt of the roll data to the operator, in order to confirm that the grinding machine has received the data and is ready to begin the grinding operation. The reading means is then retracted to a position away from the support means to provide clearance for removal and replacement of the workpiece.

Optionally, the data may be written to a database for retrieval of historical data related to the specific roll that is associated with the RFID tag.

While the preferred embodiment of the invention describes a linear displacement mechanism, whereby the transponder is advanced and retracted on a horizontal axis substantially parallel with the roll in the grinding position, other movement means may be constructed, whereby the positioning means moves laterally, vertically, or rotationally, when moving said reading means into proximity with said passive memory device, and would thus be considered to be within the spirit of the invention, and within the scope of the appended claims.

According to the provisions of the patent statutes, I have explained the principle, preferred construction, and mode of operation of the invention, and have illustrated and described what I now consider to represent its best embodiments. However, it should be understood that within the scope of the appended claims and the foregoing description, the invention may be practiced, otherwise than specifically illustrated and described.

APPENDIX A

Listing of Optional Data Fields for RFID Tags

Column_Name
1 ID (internal to DB)
2 Grinder no
3 Start date/time
4 Rolling mill
5 Roll type
6 Roll material
7 Roll Nb
8 Roll code
9 Program code
10 Profile code
11 Profile height
12 Dress code
13 Dress height 14 Diameter before head
15 Diameter before mid
16 Diameter before tail
17 End date/time
18 Regrind status
19 Present diameter max
20 Present diameter min
21 Present diameter head
22 Present diameter mid
23 Present diameter tail
24 Taper
25 Profile
26 Roundness
27 Runout
28 Crack
29 C Position
30 C Angle
31 Bruise
32 B Position
33 B Angle
34 MaxStructure
35 MinStructure
36 Ultrasound
37 U Position
38 U Angle
39 Wheel diameter start
40 Wheel diameter end
41 Roughness head
42 Roughness mid
43 Roughness tail
44 RoughnessAverage
45 RoughnessDeviation
46 Hardness head
47 Hardness mid
48 Hardness tail
Remarks
50 Validate/Discard
51 Operator code
52 Wheel type
53 Wheel no
54 Last use mid diameter
55 IntTime
56 WeightRemoved
57 LastGrind

I claim:

1. A system for acquiring data from a passive memory device for use in an automated roll grinding machine comprising:
said passive memory device having data stored thereon associated with a roll to which said passive memory device is attached;
reading means for reading data from said passive memory device communicatively coupled with a controller for digitally controlling a roll grinding machine; and
positioning means for movement of said reading means from a retracted position to an extended position adjacent to said passive memory device,
said controller being programmed to sense that a roll is positioned within said roll grinding machine, and to extend said positioning means into a position proximate said passive memory device;
and to return to a retracted position upon completion of the data reading function.

2. The system as set forth in claim 1, wherein said reading means comprises a transponder device for exciting an electro-magnetic field in said passive memory device when disposed approximate to said passive memory device, said transponder being programmed to read data from said passive memory device and transmit said data to said controller.

3. The system as set forth in claim 1, wherein the said passive memory device comprises a radio frequency identification tag.

4. The system as set forth in claim 3, wherein the positioning means comprises a cylinder having a central bore and a rod axially disposed within said bore, said rod being positionable pneumatically in at least two positions, a retracted position and an extended position.

5. The system as set forth in claim 4, also comprising a mounting bracket attached to said grinding machine for supporting said cylinder and adjustment means attached to said mounting bracket for setting the distance between the passive memory device and the transponder when the cylinder is fully extended.

6. The system as set forth in claim 5, also comprising an offset bracket for axially positioning the transponder in alignment with the passive memory device.

7. The system as set forth in claim 6, wherein the said cylinder also having inlet and outlet ports, a directional valve for pneumatic control, responsive to electronic or digital signals from said controller for advancing and retracting said transponder.

8. The system as set forth in claim 4, wherein the said cylinder is operable by pressurized fluid.

9. The system as set forth in claim 1, wherein said passive memory device is communicatively coupled with said controller by a serial interface to a programmable logic controller.

10. The system as set forth in claim 9, wherein said serial interface also comprises a dual twisted pair cable.

11. The system as set forth in claim 9, also comprising a database associated with said controller for storage of historical roll data.

12. The system as set forth in claim 1, wherein the positioning means is extended upon the initiation of a signal to rotate the roll in the grinding machine controller.

13. The system as set forth in claim 12, wherein the reading means reads the passive memory device while said transponder remains in a stationary position in an extended position as passive memory device rotates about at least a portion of a 360-degree radius.

14. The system as set forth in claim 3, wherein said roll also having a circular surface portion having a recessed cavity at one end, and said RFID tag being attached within said recessed cavity.

15. The system as set forth in claim 14, wherein said recessed cavity being positioned adjacent the peripheral edge of said circular surface portion.

16. The system as set forth in claim 1, wherein said reading means being positioned sufficiently close to induce an electro-magnetic field to excite said passive memory device for transmitting data to said reading means.

17. The system as set forth in claim 1, wherein said positioning means comprises a movement which is selected from the group including laterally, vertically, or rotational, for moving said reading means into proximity with said passive memory device.

18. A method for controlling a computer-controlled roll grinding machine comprising:
providing a work roll with at least one passive memory storage device;

storing data on said passive memory storage device related to the work roll to which it is attached;

positioning said work roll within a support frame in the grinding machine for measurement and grinding;

rotating said work roll in said support frame;

verifying that the work roll is in the desired position for grinding;

advancing a reading means toward the memory storage device within a spacing sufficiently proximate to said memory storage means for communication to occur between said memory storage device and the reading means;

accessing said data from the memory storage means;

communicating said data to a computer associated with the grinding apparatus for controlling said grinding apparatus;

acknowledging receipt of said data to an operator associated with said grinding apparatus; and retracting said reading means to a position away from the support means to provide clearance for removal and replacement of the workpiece.

\* \* \* \* \*

UNITED STATES PATENT AND TRADEMARK OFFICE
CERTIFICATE OF CORRECTION

PATENT NO. : 6,976,900 B2
DATED : December 20, 2005
INVENTOR(S) : Bolz, William F.

It is certified that error appears in the above-identified patent and that said Letters Patent is hereby corrected as shown below:

Title page,
Item [73], Assignee, "Philadelphia" should be -- Pittsburgh --.

Column 7,
Line 36, "Remarks" should be -- 49 Remarks --.

Signed and Sealed this

Twenty-first Day of March, 2006

JON W. DUDAS
*Director of the United States Patent and Trademark Office*